(12) United States Patent
Kitamura

(10) Patent No.: US 10,742,366 B2
(45) Date of Patent: Aug. 11, 2020

(54) ERROR MONITORING APPARATUS, METHOD, AND RECORDING MEDIUM

(71) Applicant: NEC Corporation, Minato-ku, Tokyo (JP)

(72) Inventor: Takeshi Kitamura, Tokyo (JP)

(73) Assignee: NEC CORPORATION, Tokyo (JP)

(*) Notice: Subject to any disclaimer, the term of this patent is extended or adjusted under 35 U.S.C. 154(b) by 177 days.

(21) Appl. No.: 15/746,475

(22) PCT Filed: Aug. 17, 2016

(86) PCT No.: PCT/JP2016/003750
§ 371 (c)(1),
(2) Date: Jan. 22, 2018

(87) PCT Pub. No.: WO2017/029809
PCT Pub. Date: Feb. 23, 2017

(65) Prior Publication Data
US 2018/0212723 A1    Jul. 26, 2018

(30) Foreign Application Priority Data
Aug. 19, 2015  (JP) ................................ 2015-162014

(51) Int. Cl.
*H04L 1/20* (2006.01)
*H04B 10/079* (2013.01)
(Continued)

(52) U.S. Cl.
CPC ....... *H04L 1/203* (2013.01); *H04B 10/07953* (2013.01); *H04L 1/0019* (2013.01); *H04L 1/242* (2013.01)

(58) Field of Classification Search
None
See application file for complete search history.

(56) References Cited

U.S. PATENT DOCUMENTS 4,617,677 A * 10/1986 Chiba ................. H04L 25/4902
327/33
5,822,139 A * 10/1998 Ayabe .................... G11B 5/012
360/31
(Continued)

FOREIGN PATENT DOCUMENTS

CN   102831789 A   12/2012
CN   103929211 A   7/2014
(Continued)

OTHER PUBLICATIONS

Extended European Search Report for EP Application No. EP16836802.5 dated Jul. 26, 2018.
(Continued)

*Primary Examiner* — Phung M Chung

(57) ABSTRACT

In order to enable to estimate whether the bit error occurs steadily or instantaneously, an error monitoring method according to an exemplary aspect of the invention includes: detecting number of error bits of received data per bits whose number is predetermined, comparing the number of error bits with a threshold value which is predetermined, and counting and outputting number of times of continuous occurrence of the comparison result's indicating being large, and number of times of continuous occurrence of the comparison result's indicating being small.

18 Claims, 15 Drawing Sheets

(51) Int. Cl.
*H04L 1/00* (2006.01)
*H04L 1/24* (2006.01)

(56) References Cited

U.S. PATENT DOCUMENTS

| | | |
|---|---|---|
| 10,042,725 B2 * | 8/2018 | Noguchi ................ G11C 29/52 |
| 2002/0044619 A1 * | 4/2002 | Kobori ................ H04B 7/2668 |
| | | 375/365 |
| 2004/0181741 A1 | 9/2004 | Hata et al. |
| 2006/0013156 A1 | 1/2006 | Miyoshi et al. |
| 2011/0087947 A1 | 4/2011 | Ono |
| 2014/0245104 A1 | 8/2014 | Song et al. |
| 2014/0293764 A1 | 10/2014 | Yasukawa |
| 2014/0331109 A1 * | 11/2014 | Wakuda ................ G06F 11/076 |
| | | 714/799 |
| 2016/0241034 A1 | 8/2016 | Tokunaga et al. |

FOREIGN PATENT DOCUMENTS

| | | |
|---|---|---|
| CN | 104022784 A | 9/2014 |
| JP | H06-268633 A | 9/1994 |
| JP | H10-117181 A | 5/1998 |
| JP | 2001-203673 A | 7/2001 |
| JP | 2002-158739 A | 5/2002 |
| JP | 2015-069545 A | 4/2015 |
| WO | 2004/017555 A1 | 2/2004 |
| WO | 2007/110912 A1 | 10/2007 |

OTHER PUBLICATIONS

International Search Report for PCT Application No. PCT/JP2016/003750, dated Nov. 8, 2016.
English translation of Written opinion for PCT Application No. PCT/JP2016/003750.
Chinese Office Action for CN Application No. 201680047583.0 dated Mar. 20, 2020 with English Translation.

* cited by examiner

Fig.10

| FRAME NUMBER | a (AFTER UPDATE) | b | c | OUTPUT |
|---|---|---|---|---|
| 0 | 0 ("EQUAL TO OR SMALLER THAN THRESHOLD VALUE") | 0 | 1 | |
| 1 | 0 | 0 | 2 | |
| 2 | 0 | 0 | 3 | |
| 3 | 0 | 0 | 4 | |
| 4 | 1 ("LARGER THAN THRESHOLD VALUE") | 1 | 4 | |
| 5 | 1 | 2 | 4 | |
| 6 | 1 | 3 | 4 | |
| 7 | 1 | 4 | 4 | |
| 8 | 0 | 0 | 1 | b=4, c=4 |
| 9 | 0 | 0 | 2 | |
| 10 | 0 | 0 | 3 | |
| 11 | 1 | 1 | 3 | |
| 12 | 0 | 0 | 1 | b=1, c=3 |
| 13 | 0 | 0 | 2 | |
| 14 | 0 | 0 | 3 | |

ERROR MONITORING APPARATUS, METHOD, AND RECORDING MEDIUM

This application is a National Stage Entry of PCT/JP2016/003750 filed on Aug. 17, 2016, which claims priority from Japanese Patent Application 2015-162014 filed on Aug. 19, 2015, the contents of all of which are incorporated herein by reference, in their entirety.

TECHNICAL FIELD

The present invention relates to an error monitoring apparatus, a method, and a recording medium configured to monitor continuity of a bit error occurring on a transmission line.

BACKGROUND ART

In the case of signal transmission through a long-haul optical fiber, there is a case that a signal is degraded due to occurrence of optical noise caused by optical amplification on an optical transmission line, and noise caused in a receiver, and thereby a bit error (in the case of a binary signal, a change of value from 0 to 1, or 1 to 0) occurs. Therefore, an optical transmitter adds an error correction code to a transmission signal and transmits the transmission signal including the error correction code, and an optical receiver detects number of error bits included in a received signal, and corrects the error bit on the basis of the error correction code.

Since the error correction code is usually added every one frame, detection of the number of error bits and correction of the error bit are carried out every one frame. However, in the case of optical transmission, number of the frames transmitted in one second is vast. For example, in the case of OTU (Optical channel Transport Unit) 4, number of the frames, which are transmitted in one second, is 856,388. Therefore, when outputting a number of error bits per frame to an outside, there is a possibility that an amount of output data becomes large and the large amount of output data causes a processing delay, or the like.

In order to make the amount of the output data small, a method of integrating the number of error bits, which are detected every one frame, in a unit of time (for example, one second), and outputting the integration result to the outside is conceivable.

For example, according to a method which is described by a patent literature (hereinafter, abbreviated as PTL) 1, a number of error bits, which occur in a predetermined monitoring period of time, is integrated, and it is determined that degradation is detected when a degradation detection condition is satisfied successively M times on the assumption that the degradation detection condition is satisfied once when an integration value exceeds a threshold value.

Moreover, as a cause of occurrence of the error, influence of steady noise occurring in a transmission system, and influence of instantaneous disturbance or the like are conceivable. In the case of the error due to the influence of the steady noise, a temporal change in the number of error bits is gradual, and the bit error is distributed at random. On the other hand, in the case of the error due to the influence of the instantaneous disturbance or the like, the number of error bits increases only in some frames. As mentioned above, it is possible to estimate the cause of the error by knowing whether the bit error occurs steadily or instantaneously.

CITATION LIST

Patent Literature

[PTL 1] Japanese Patent Application Laid-Open Publication No. 1998-117181

SUMMARY OF INVENTION

Technical Problem

However, if the number of error bits is integrated in the unit of time like the method of PTL 1, the number of error bits, which occur in the period of time, is averaged. Therefore, there is a possibility that, from an outputted result, it is not recognized that the error increases instantaneously, even when the number of error bits increases instantaneously.

FIG. 15 illustrates an example of an integration number of errors occurring in the unit of time. A horizontal axis, and a vertical axis of FIG. 15 indicate time, and the integration number of the number of error bits occurring in the unit of time, respectively. A cycle $\tau$ is the unit of time, and a total of the numbers of error bits per frame in the unit of time is the integration number of error bits.

It is assumed that the number of error bits increases instantaneously in a period from time Te-$\tau$ to time Te as illustrated in FIG. 16. In the case that a number of frames in the unit of time is large, there is a possibility that the number of error bits is averaged even when the number of error bits increases instantaneously, and thereby the integration number of error bits becomes almost equal to the previous and the following integration numbers of error bits as illustrated in FIG. 15.

Therefore, there is a possibility that, when the number of error bits is integrated, it is not possible to recognize whether the error bit occurs steadily or instantaneously, and thereby it is not possible to estimate the cause of the error.

An object of the present invention is to provide an error monitoring apparatus, a method, and a recording medium which can estimate whether the bit error occurs steadily or instantaneously.

Solution to Problem

For settling the above-mentioned problem, an error monitoring apparatus according to an exemplary aspect of the invention comprises: an error detection means for detecting number of error bits of received data per bits whose number is predetermined, a comparison means for comparing the number of error bits with a threshold value which is predetermined, and a count means for counting and outputting number of times of continuous occurrence of the comparison result's indicating being large, and number of times of continuous occurrence of the comparison result's indicating being small.

And, an error monitoring method according to an exemplary aspect of the invention comprises: detecting number of error bits of received data per bits whose number is predetermined, comparing the number of error bits with a threshold value which is predetermined, and counting and outputting number of times of continuous occurrence of the comparison result's indicating being large, and number of times of continuous occurrence of the comparison result's indicating being small.

And, a computer readable recording medium recorded with an error monitoring program according to an exemplary aspect of the invention which causes a computer to execute:

an error detection function of detecting number of error bits of received data per bits whose number is predetermined, a comparison function of comparing the number of error bits with a threshold value which is predetermined, and a count function of counting and outputting number of times of continuous occurrence of the comparison result's indicating being large, and number of times of continuous occurrence of the comparison result's indicating being small.

Advantageous Effects of Invention

By the error monitoring apparatus, the method, and the recording medium of the present invention, it is possible to estimate whether the bit error occurs steadily or instantaneously.

BRIEF DESCRIPTION OF DRAWINGS

FIG. 10 shows a diagram for explaining another example of the operation of the count unit of the second example embodiment of the present invention;

DESCRIPTION OF EMBODIMENTS

First Example Embodiment

A first example embodiment of the present invention will be explained in the following.

Figure 1:
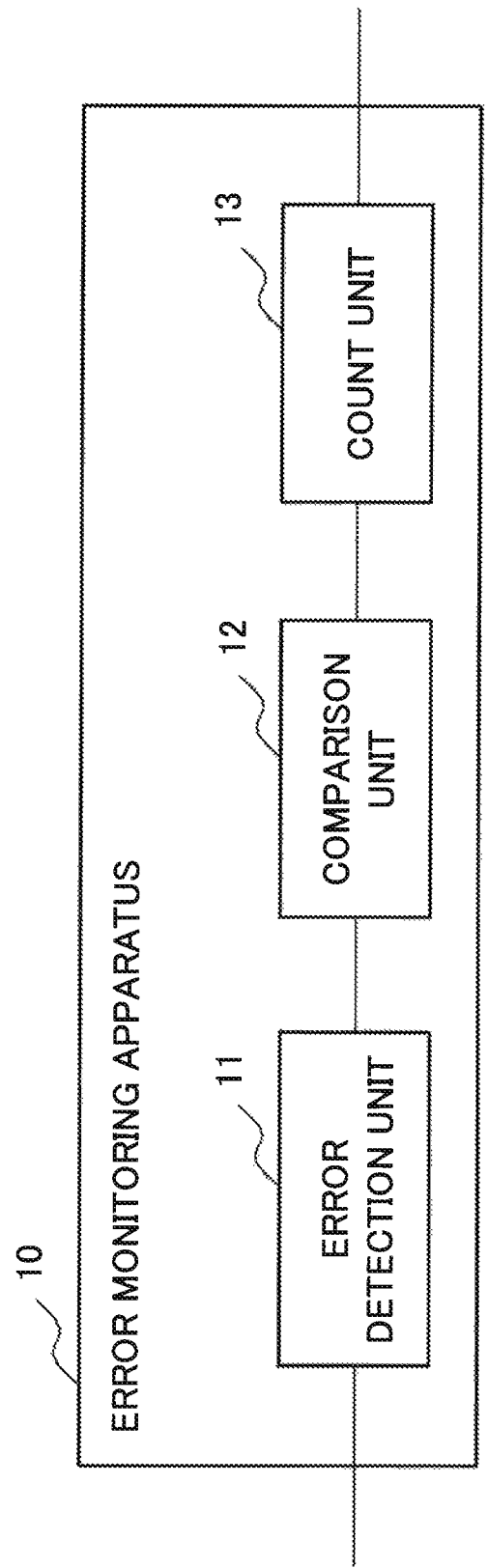
FIG. 1 shows a diagram illustrating an example of a configuration of an error monitoring apparatus of a first example embodiment of the present invention.

FIG. 1 illustrates an example of a configuration of an error monitoring apparatus 10 of the present example embodiment. The error monitoring apparatus 10 includes an error detection device 11, a comparison unit 12, and a count unit 13.

The error detection unit 11 is a component which detects a number of error bits of received data per bits whose number is predetermined. The comparison unit 12 is a component which compares the number of error bits with a predetermined threshold value. The count unit 13 is a component which counts and outputs a number of times of continuous occurrence of the comparison result's indicating that the number of error bits is large, and which counts and outputs a number of times of continuous occurrence of the comparison result's indicating that the number of error bits is small.

By configuring the error monitoring apparatus 10 as described above, it is possible to estimate whether a bit error occurs steadily or instantaneously.

Figure 2:
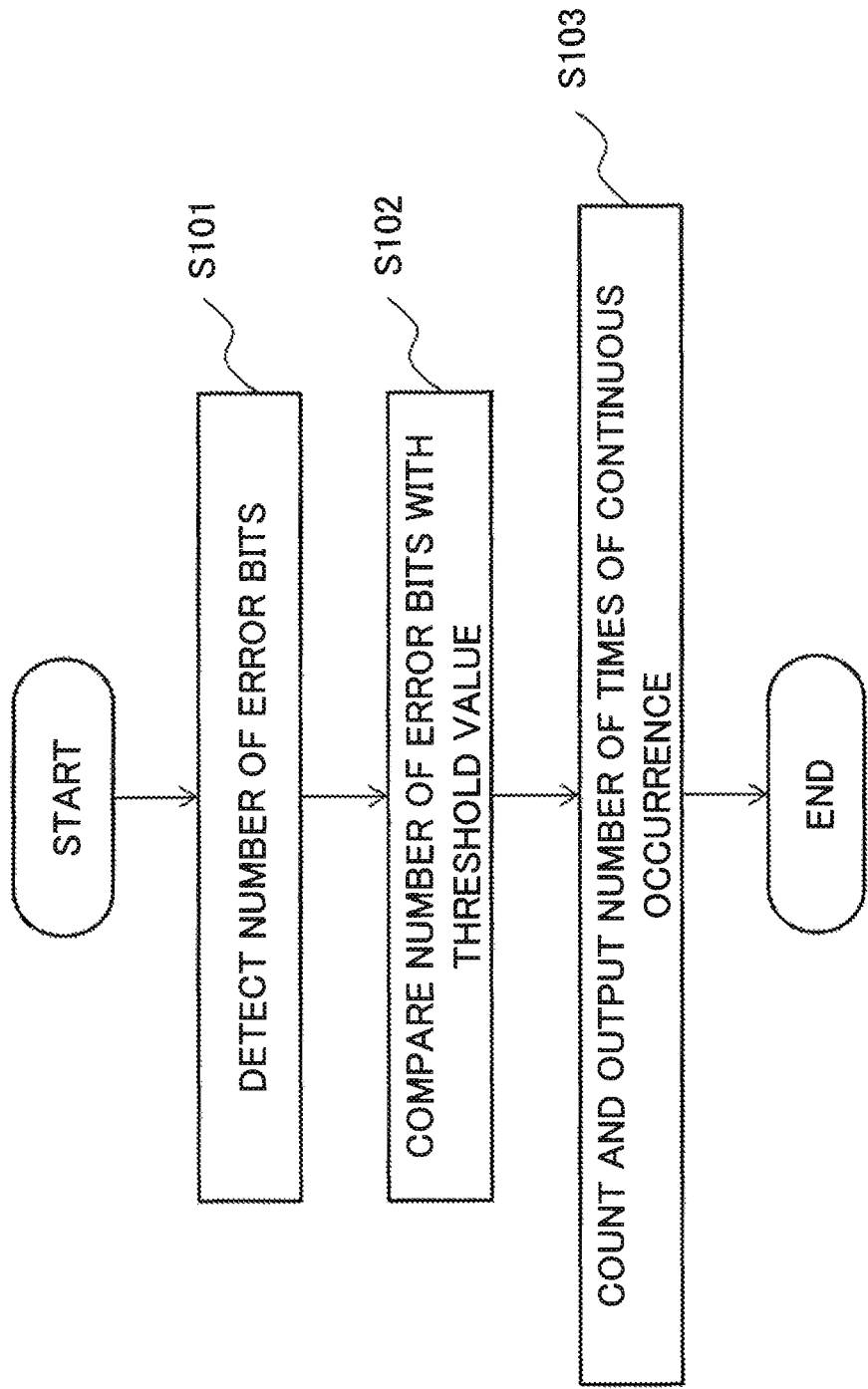
FIG. 2 shows a diagram illustrating an example of an operation of the error monitoring apparatus of the first example embodiment of the present invention.

Next, an example of an operation of the error monitoring apparatus 10 of the present example embodiment, is illustrated in FIG. 2.

The error detection unit 11 of the error monitoring apparatus 10 detects the number of error bits of the received data per bits whose number is predetermined (Step S101). Next, the comparison unit 12 compares the number of error bits with the predetermined threshold value (Step S102). Then, the count unit 13 counts the number of times of continuous occurrence of the comparison result's indicating being large, and counts number of times of continuous occurrence of the comparison result's indicating being small (Step S103).

By operating the error monitoring apparatus 10 as described above, it is possible to estimate whether the bit error occurs steadily or instantaneously.

As mentioned above, according to the first example embodiment of the present invention, the number of error bits is compared with the predetermined threshold value, and the number of times of continuous occurrence of the comparison result's indicating being large, and the number of times of continuous occurrence of the comparison result's indicating being small are counted and outputted. It is possible to estimate that the error occurs steadily when a state that the number of error bits is large occurs more continuously than a state that the number of error bits is small, and that the error occurs instantaneously when the state that the number of error bits is small occurs more continuously than the state that the number of error bits is large. Therefore, it is possible to estimate whether the bit error occurs steadily or instantaneously.

Second Example Embodiment

Next, a second example embodiment of the present invention will be explained.

In the present example embodiment, the error monitoring apparatus 10 of the first example embodiment will be explained specifically by exemplifying a signal transmission system which uses an optical signal.

Figure 3:
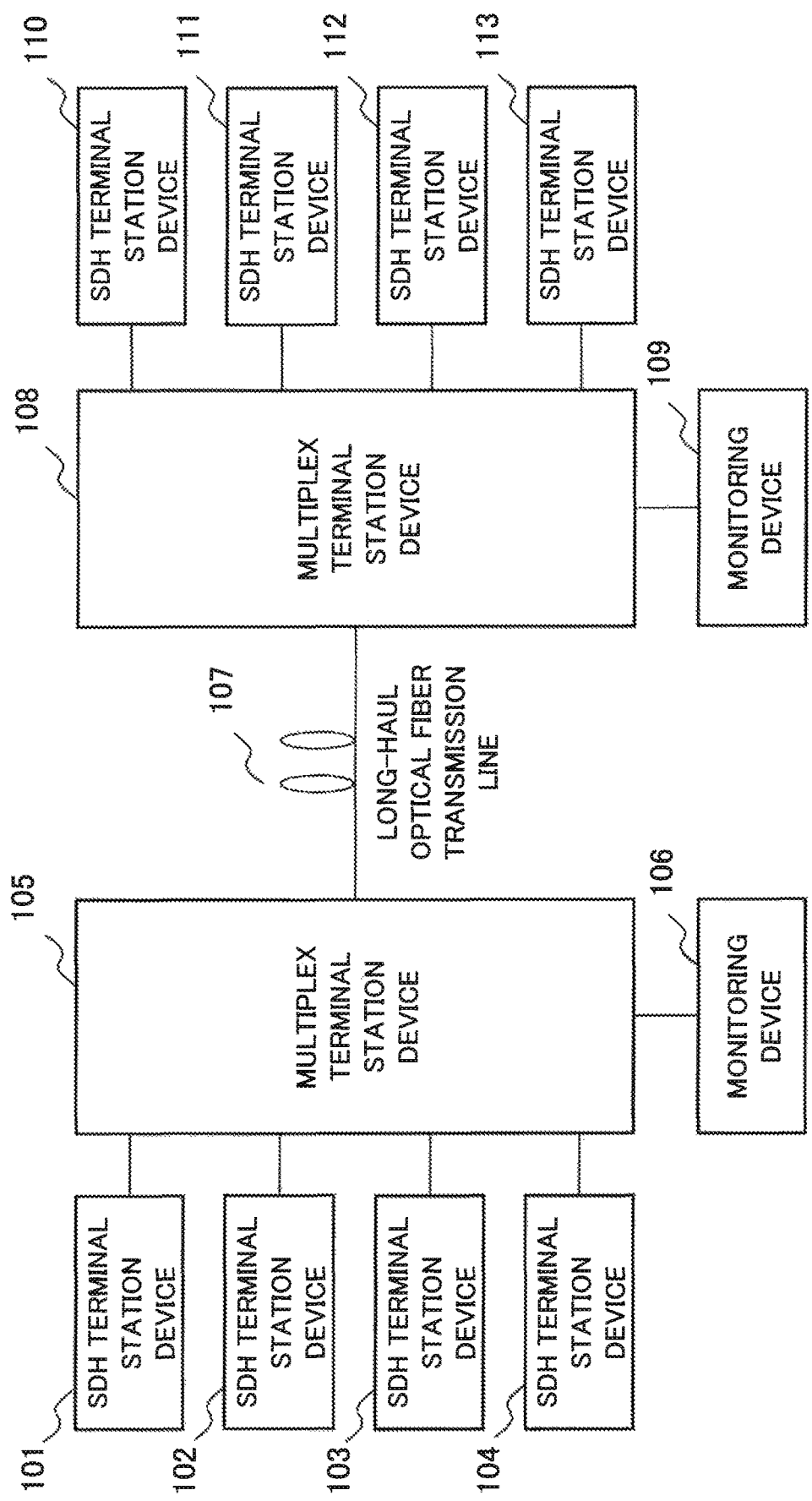
FIG. 3 shows a diagram illustrating an example of a configuration of a signal transmission system of a second example embodiment of the present invention.

FIG. 3 illustrates an example of a configuration of the signal transmission system of the present example embodiment. SDH terminal station devices 101 to 104, and 110 to 113 are terminal station devices each of which transmits and receives a data frame in conformity with SDH (Synchronous Digital Hierarchy). SDH is a standard of ITU-T (International Telecommunication Union Telecommunication Standardization Sector).

A multiplex terminal station device 105, and each of the SDH terminal station devices 101 to 104 are connected each other through an optical fiber, and a multiplex terminal station device 108, and each of the SDH terminal station devices 110 to 113 are connected each other through an optical fiber. Monitoring devices 106 and 109 are devices which monitor states of the multiplex terminal station devices 105 and 108 respectively, and a communication state of an optical signal.

The multiplex terminal station device 105 converts an optical signal, which is outputted by each of the SDH terminal station devices 101 to 104, into an electrical signal, multiplexes the electrical signals, and converts the multiplex electrical-signal into an optical signal again. Then, the multiplex terminal station device 105 transmits the optical signal to the multiplex terminal station device 108 through a long-haul optical fiber transmission line 107. The multiplex terminal station device 108 converts a received optical signal into a multiplex electrical signal, de-multiplexes the multiplex signal, and converts the de-multiplex signals into optical signals. Then, the multiplex terminal station device 108 transmits the optical signals to the SDH terminal station devices 110 to 113. As described above, the signals outputted by the SDH terminal station devices 101 to 104 are transmitted to the SDH terminal station devices 110 to 113. Similarly, it is possible to carry out transmission from the SDH terminal station devices 110 to 113 to the SDH terminal station devices 101 to 104.

Figure 4:
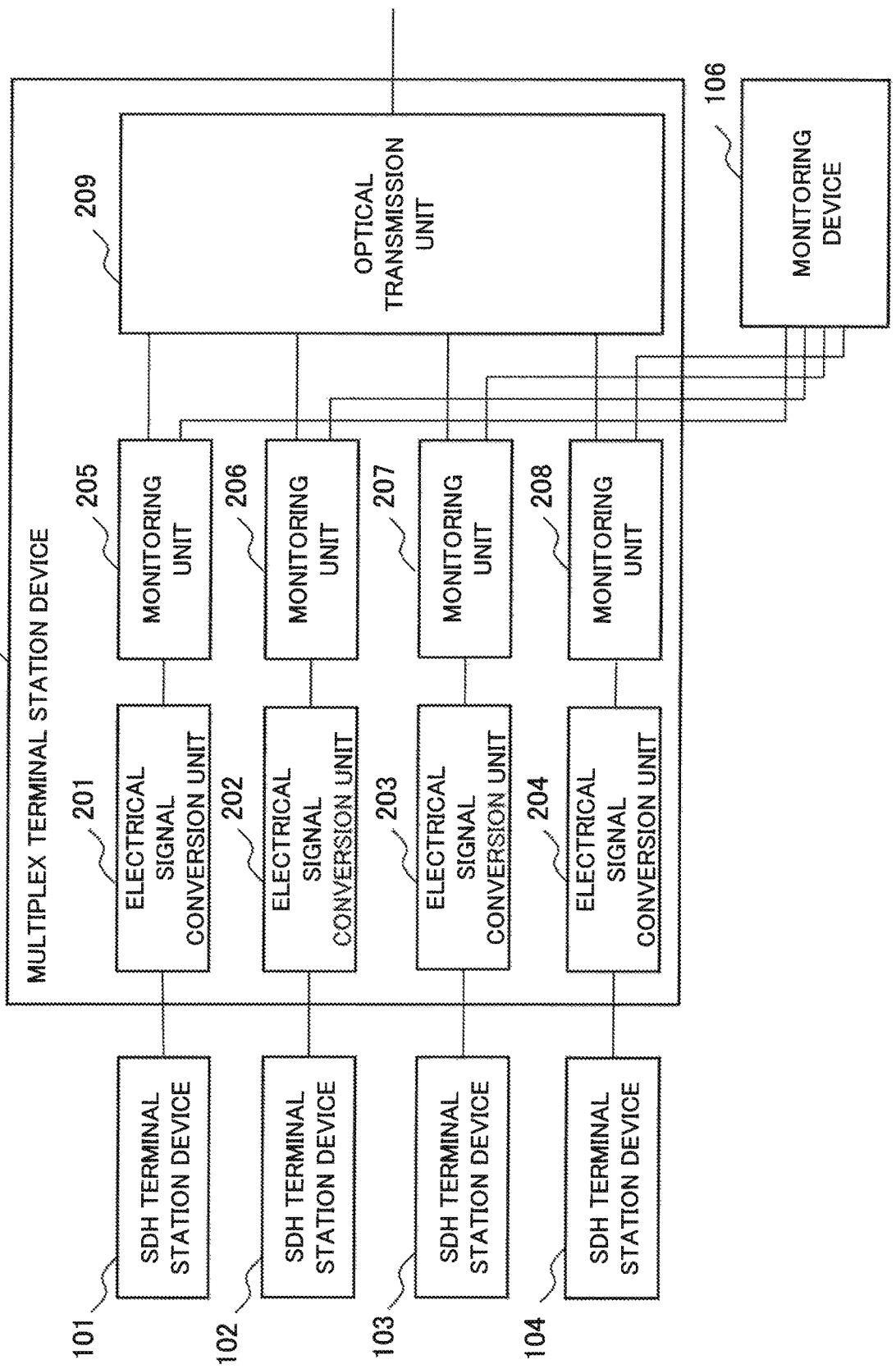
FIG. 4 shows a diagram illustrating an example of a configuration of a multiplex terminal station device of the second example embodiment of the present invention.
Figure 5:
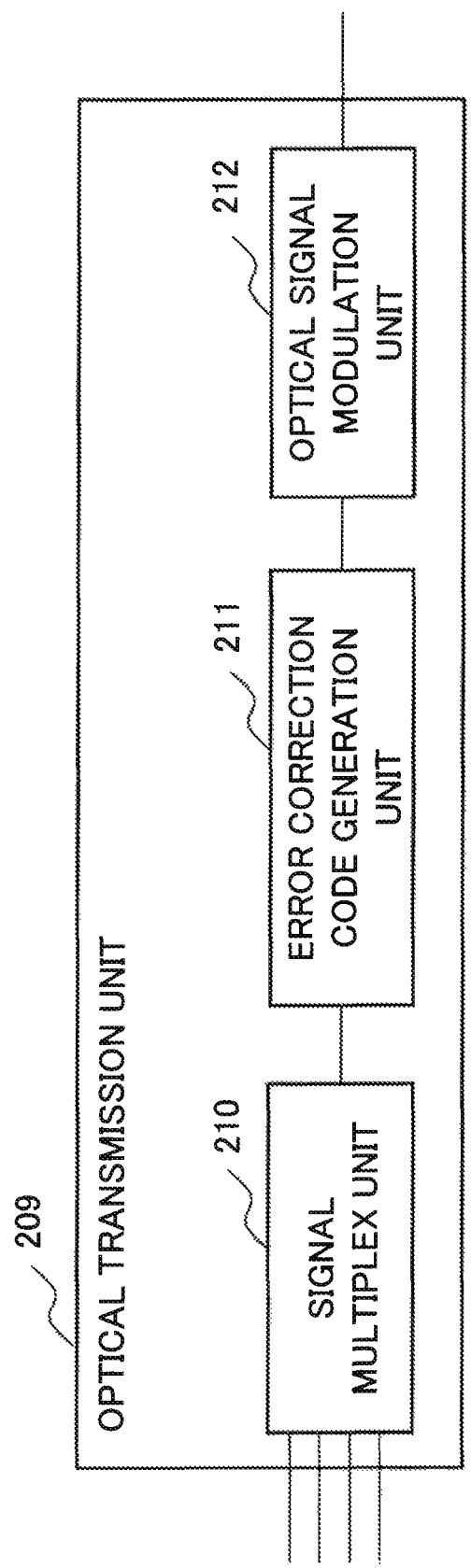
FIG. 5 shows a diagram illustrating an example of a configuration of the multiplex terminal station device of the second example embodiment of the present invention.

Each of FIG. 4 and FIG. 5 illustrates a block diagram of a transmission part of the multiplex terminal station device 105. Here, a case that the multiplex terminal station device 105 carries out transmission will be explained in the following. Moreover, a case that the multiplex terminal station device 108 carries out transmission is the same as the above-mentioned case.

Electrical signal conversion units 201 to 204 convert the optical signals, which are received from the SDH terminal station devices 101 to 104, into electrical signals and output the electrical signals to monitoring units 205 to 208 respectively. The monitoring units 205 to 208 check contents of the inputted electrical signals, and output the electrical signals to an optical transmission unit 209. Each of the monitoring units 205 to 208 checks, for example, the B1 error which is specified by SDH, or the like. When a monitoring unit detects an error, the monitoring unit notifies the monitoring device 106 that the error is detected.

A signal multiplex unit 210 (FIG. 5) of the optical transmission unit 209 multiplexes the inputted electrical signals to be transmitted using only one optical wavelength, and outputs the multiplex signal to an error correction code generation unit 211. The error correction code generation unit 211 generates an error correction code for the inputted multiplex signal, adds the error correction code to the multiplex signal, and transmits the multiplex signal including the error correction code to an optical signal modulation unit 212. The optical signal modulation unit 212 converts the inputted electrical signal into an optical signal, and outputs the optical signal to the long-haul optical fiber transmission line 107. The optical signal, which is outputted by the optical signal modulation unit 212, is transmitted to the multiplex terminal station device 108 through the long-haul optical fiber transmission line 107.

Figure 6:
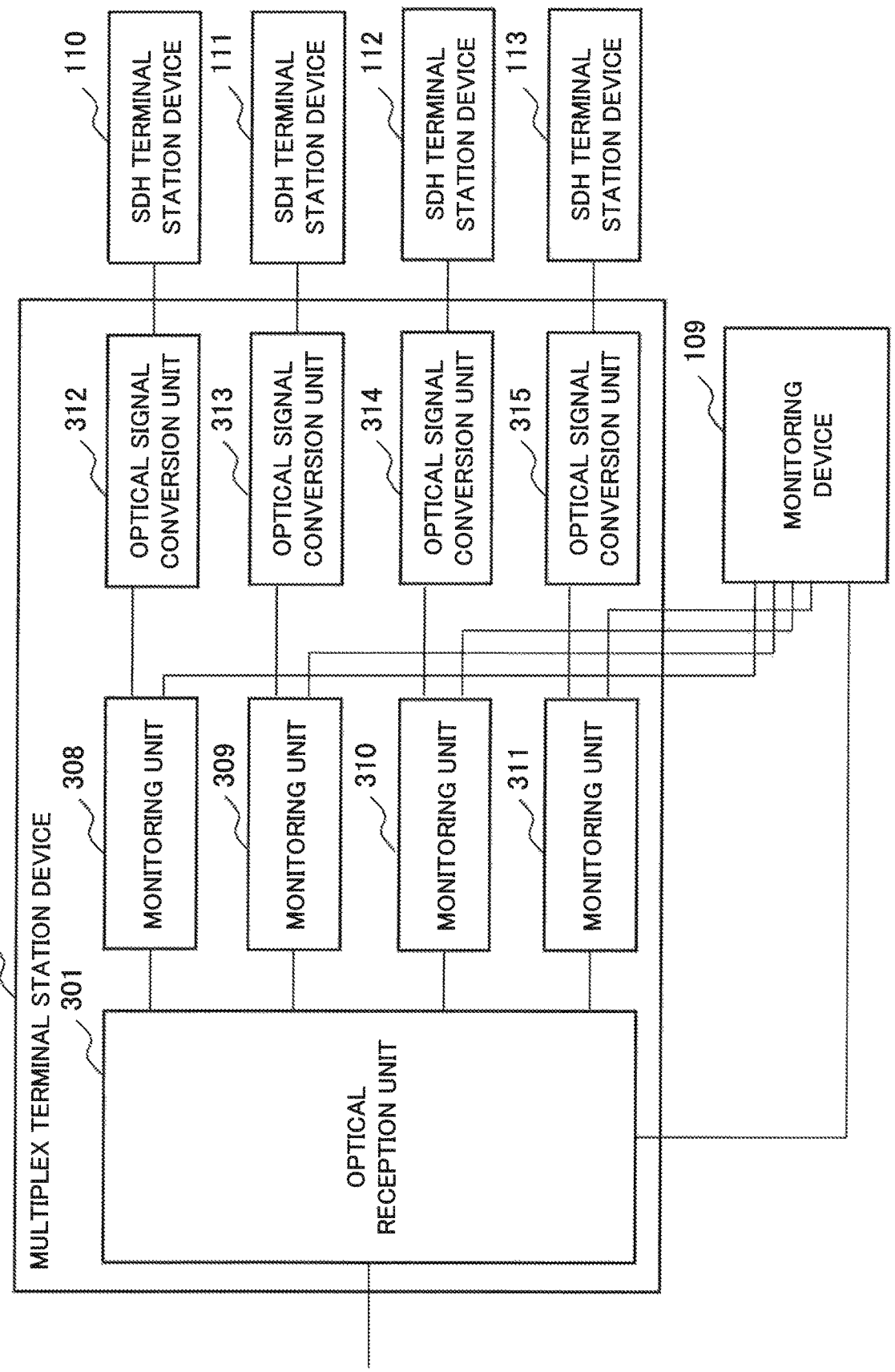
FIG. 6 shows a diagram illustrating an example of a configuration of another multiplex terminal station device of the second example embodiment of the present invention.
Figure 7:
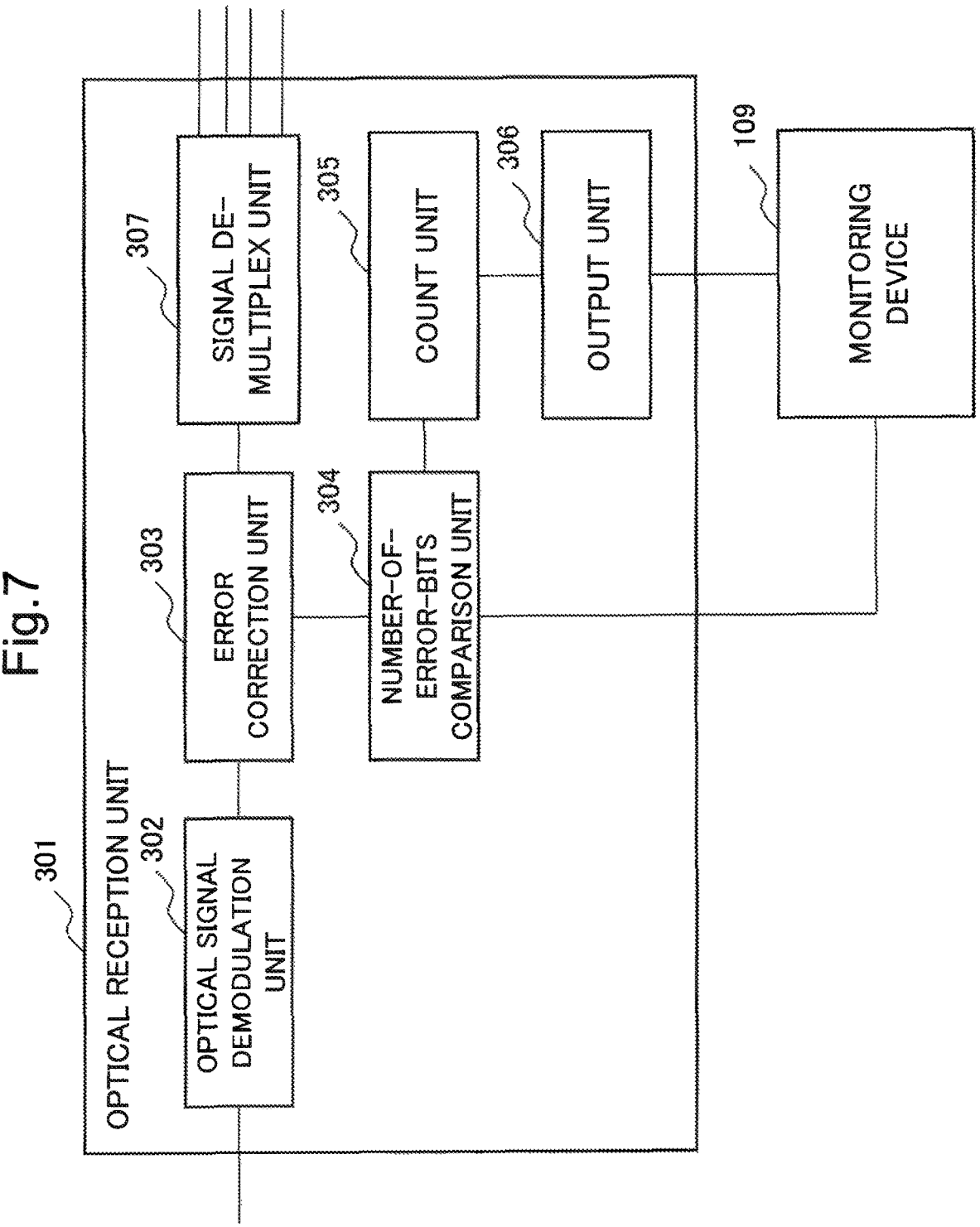
FIG. 7 shows a diagram illustrating an example of a configuration of the other multiplex terminal station device of the second example embodiment of the present invention.

Each of FIG. 6 and FIG. 7 illustrates a block diagram of a reception part of the multiplex terminal station device 108. The multiplex terminal station device 108 corresponds to the error monitoring apparatus 10 of FIG. 1. Here, a case that the multiplex terminal station device 108 carries out reception will be explained in the following. Moreover, a case that the multiplex terminal station device 105 carries out reception is the same as the above-mentioned case.

An optical signal demodulation unit 302 (FIG. 7) of an optical reception unit 301 converts the optical signal, which is received through the long-haul optical fiber transmission line 107, into an electrical signal and outputs the electrical signal to an error correction unit 303.

The error correction unit 303 corresponds to the error detection unit 11 of FIG. 1. The error correction unit 303 corrects the error, and detects the number of error bits on the basis of the error correction code which is added to the electrical signal. Since the error correction code is added per frame, correction of the error and detection of the number of error bits are carried out per frame. Then, after the correction of the error, the error correction unit 303 outputs the number of error bits to a number-of-error-bits comparison unit 304, and outputs a signal, whose error is corrected, to a signal de-multiplex unit 307.

The number-of-error-bits comparison unit 304 corresponds to the comparison unit 12 of FIG. 1. The number-of-error-bits comparison unit 304 compares the number of error bits, which is received from the error correction unit 303, with a predetermined threshold value, and outputs the comparison result per frame to a count unit 305, that is, outputs the comparison result per frame to the count unit 305 whether the number of error bits is larger than the threshold value ("Larger than threshold value") or is equal to or smaller than the threshold value ("Equal to or smaller than threshold value"). It is possible, for example, for the monitoring device 109 to set the threshold value in advance. Moreover, it is also possible to set the threshold value to be 0, and to output determination whether the number of error bits exists or not as the comparison result. Moreover, the number-of-error-bits comparison unit 304 may output "Equal to or larger than threshold value" or "Smaller than threshold value" as the comparison result.

The count unit 305 and an output unit 306 correspond to the count unit 13 of FIG. 1. The count unit 305 counts number of times of continuous occurrence of "Larger than threshold value", and number of times of continuous occurrence of "Equal to or smaller than threshold value" with reference to the comparison result which is inputted per frame from the error bit comparison unit 304. The output unit 306 outputs the number of times of continuous occurrence of "Larger than threshold value", and the number of times of continuous occurrence of "Equal to or smaller than threshold value", which are counted by the count unit 305, to the monitoring device 109.

According to the present example embodiment, when the comparison result changes from "Larger than threshold value" to "Equal to or smaller than threshold value", the number of times of continuous occurrence of "Larger than threshold value", and the number of times of continuous occurrence of "Equal to or smaller than threshold value" are outputted to the following units (the monitoring device 109 and the like), and are cleared. By carrying out the above, it is possible to reduce number of times of outputting error information in comparison with a case that the number of error bits is outputted per frame to the following units.

Moreover, by carrying out the above, the number of times of continuous occurrence of "Larger than threshold value", and the number of times of the following continuous occurrence of "Equal to or smaller than threshold value" are counted and outputted at a period from a time when the comparison result changes from "Larger than threshold value" to "Equal to or smaller than threshold value" up to a time when the comparison result changes again from "Larger than threshold value" to "Equal to or smaller than threshold value". In other words, the number of times of continuous occurrence of the comparison result's indicating "Equal to or smaller than threshold" is counted, and afterward the number of times of continuous occurrence of the comparison result's indicating "Larger than threshold value" is counted, and then two kinds of the number of times of continuous occurrence are outputted at timing when the comparison result indicates "Equal to or smaller than threshold value". Thereby, it is possible to output the comparison result's indicating "Larger than threshold value" together with the number of times of continuous occurrence of the comparison result's indicating "Larger than threshold value", and notify the following unit of two outputs mentioned above.

When the bit error occurs steadily, the number of times of continuous occurrence of "Larger than threshold value" is larger than that of "Equal to or smaller than threshold value". On the other hand, when the bit error occurs instantaneously, the number of times of continuous occurrence of "Larger than threshold value" is smaller than that of "Equal to or smaller than threshold value". Therefore, based on the number of times of continuous occurrence of "Larger than threshold value", and the number of times of continuous occurrence of "Equal to or smaller than threshold value", it is possible to estimate whether the bit error occurs steadily or instantaneously.

Here, while the case that the numbers of times of continuous occurrence are outputted when the comparison result changes from "Larger than threshold value" to "Equal to or smaller than threshold value" has been explained in the present example embodiment, it is also possible to output the numbers of times of continuous occurrence when the comparison result changes from "Equal to or smaller than threshold value" to "Larger than threshold value". Moreover, it is also possible to output the number of times of continuous occurrence when the comparison result changes from "Larger than threshold value" to "Equal to or smaller than threshold value", and to output the number of times of continuous occurrence when the comparison result changes from "Equal to or smaller than threshold value" to "Larger than threshold value".

The signal de-multiplex unit 307 de-multiplexes the multiplex signal which is inputted from the error correction unit 303 and whose error is corrected, and outputs de-multiplex signals to monitoring units 308 to 311 (FIG. 6). The monitoring units 308 to 311 check contents of the received de-multiplex signals, and outputs the checked de-multiplex signals to optical signal conversion units 312 to 315, respectively. For example, each of the monitoring units 308 to 311 checks, for example, the B1 error which is specified by the SDH standard. When one monitoring unit detects an error, the monitoring unit notifies the monitoring device 109 that the error is detected. The optical signal conversion units 312 to 315 convert electrical signals, which are received from the monitoring units 308 to 311, into optical signals, and transmit the optical signals to the SDH terminal station devices 110 to 113, respectively.

By configuring the error monitoring apparatus 10 (multiplex terminal station device 108) as mentioned above, it is possible to estimate whether the bit error occurs steadily or instantaneously.

Next, an example of an operation which is carried out by the error monitoring apparatus 10 (multiplex terminal station device 108) of the present example embodiment will be explained with reference to FIG. 2.

Firstly, the error correction unit 303 of the multiplex terminal station device 108 carries out error correction per frame to the received data (Step S101). Next, the number-of-error-bits comparison unit 304 compares the number of error bits with the threshold value, and outputs the comparison result per frame to the count unit 305 (Step S102). Then, the count unit 305 counts the numbers of times of continuous occurrence (the number of times of continuous occurrence of the comparison result's indicating "Larger than threshold value", and the number of times of continuous occurrence of the comparison result's indicating "Equal to or smaller than threshold value"), and the output unit 306 outputs the numbers of times of continuous occurrence (Step S103).

Figure 8:
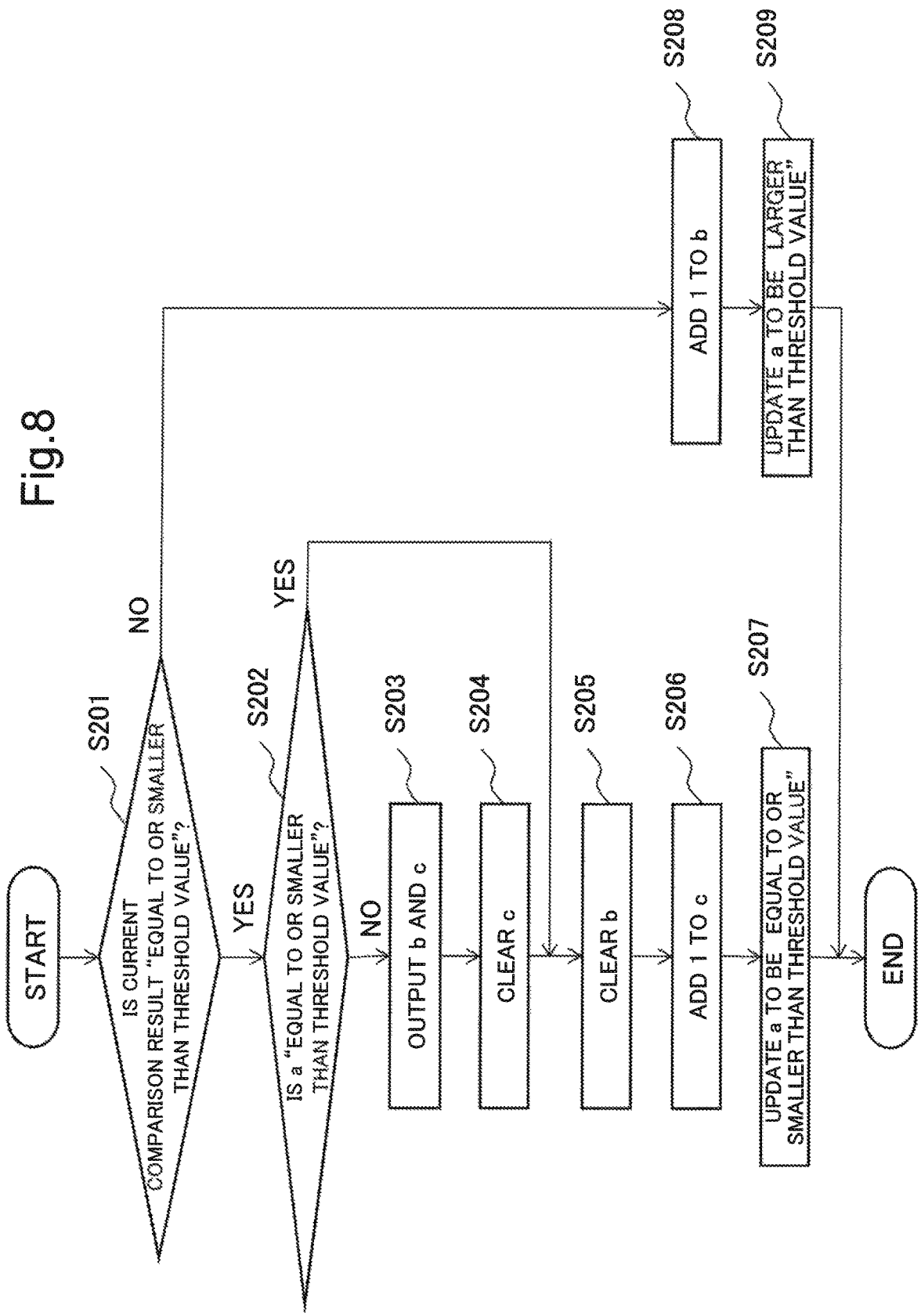
FIG. 8 shows a diagram illustrating an example of an operation of a count unit of the second example embodiment of the present invention.

FIG. 8 illustrates an example of a method of counting the numbers of times of continuous occurrence in Step S103.

The count unit 305 receives the comparison result of comparing the number of error bits with the threshold value from the number-of-error-bits comparison unit 304. Then, the count unit 305 counts the number of times of continuous occurrence of "Larger than threshold value", and the number of times of continuous occurrence of "Equal to or smaller than threshold value" with reference to the received comparison result. Specifically, the count unit 305 holds and updates the comparison result on the latest frame (a), the number of times of continuous occurrence of "Larger than threshold value" (b), and the number of times of continuous occurrence of "Equal to or smaller than threshold value" (c).

Firstly, the count unit 305 determines whether the comparison result, which is inputted from the number-of-error-bits comparison unit 304, indicates "Larger than threshold value" or "Equal to or smaller than threshold value" (Step S201). When the comparison result indicates "Equal to or smaller than threshold value", the count unit 305 determines whether the comparison result on the latest frame (one frame before) (a) indicates "Larger than threshold value", or "Equal to or smaller than threshold value" (Step S202).

When the comparison result on the latest frame (a) indicates "Larger than threshold value" in Step S202, it is found that the comparison result changes from "Larger than threshold value" to "Equal to or smaller than threshold value". Therefore, the count unit 305 outputs the number of times of continuous occurrence of "Larger than threshold value" (b), and the number of times of continuous occurrence of "Equal to or smaller than threshold value" (c) to the output unit 306. The output unit 306 outputs the numbers of times of continuous occurrence (b and c) to the monitoring device (Step S203). Then, the count unit 305 clears the number of times of continuous occurrence of "Equal to or smaller than threshold value" (c), and the number of times of continuous occurrence of "Larger than threshold value" (b) (Step S204 and Step S205). Since the current comparison result indicates "Equal to or smaller than threshold value", the count unit 305 adds 1 to the number of times of continuous occurrence of "Equal to or smaller than threshold value" (c) (Step S206), and updates the comparison result on the latest frame (a) to be "Equal to or smaller than threshold value" (Step S207).

On the other hand, when the comparison result on the latest frame (a) is "Equal to or smaller than threshold value" in Step S202, the comparison result does not change from "Equal to or smaller than threshold value". Therefore, the count unit 305 clears the number of times of continuous occurrence of "Larger than threshold value" (b) (Step S205), and adds 1 to the number of times of continuous occurrence of "Equal to or smaller than threshold value" (c) (Step S206). Moreover, the count unit 305 updates the comparison result on the latest frame (a) to be "Equal to or smaller than threshold value" (Step S207).

When the current comparison result indicates "Larger than threshold value" in Step S201, the count unit 305 adds 1 to the number of times of continuous occurrence of "Larger than threshold value" (b) (Step S208), and updates the comparison result on the latest frame (a) to be "Larger than threshold value" (Step S209).

By working the count unit 305 and the output unit 306 as mentioned above, it is possible to count the number of times of continuous occurrence of "Larger than threshold value" (b), and the number of times of continuous occurrence of "Equal to or smaller than threshold value" (c) with reference to the comparison result which is inputted from the number-of-error-bits comparison unit 304. Moreover, since each number of times of continuous occurrence is outputted to the monitoring device 109, which is the following unit, at a time when the comparison result changes from "Larger than threshold value" to "Equal to or smaller than threshold value", the following unit can know that the number of error bits is "Larger than threshold value", and thereby, it is possible to estimate whether the bit error occurs steadily or instantaneously.

Next, an example of an operation (refer to FIG. 8) which is carried out by the count unit 305 and the output unit 306 will be specifically explained with reference to FIG. 9 and FIG. 10.

Figure 9:
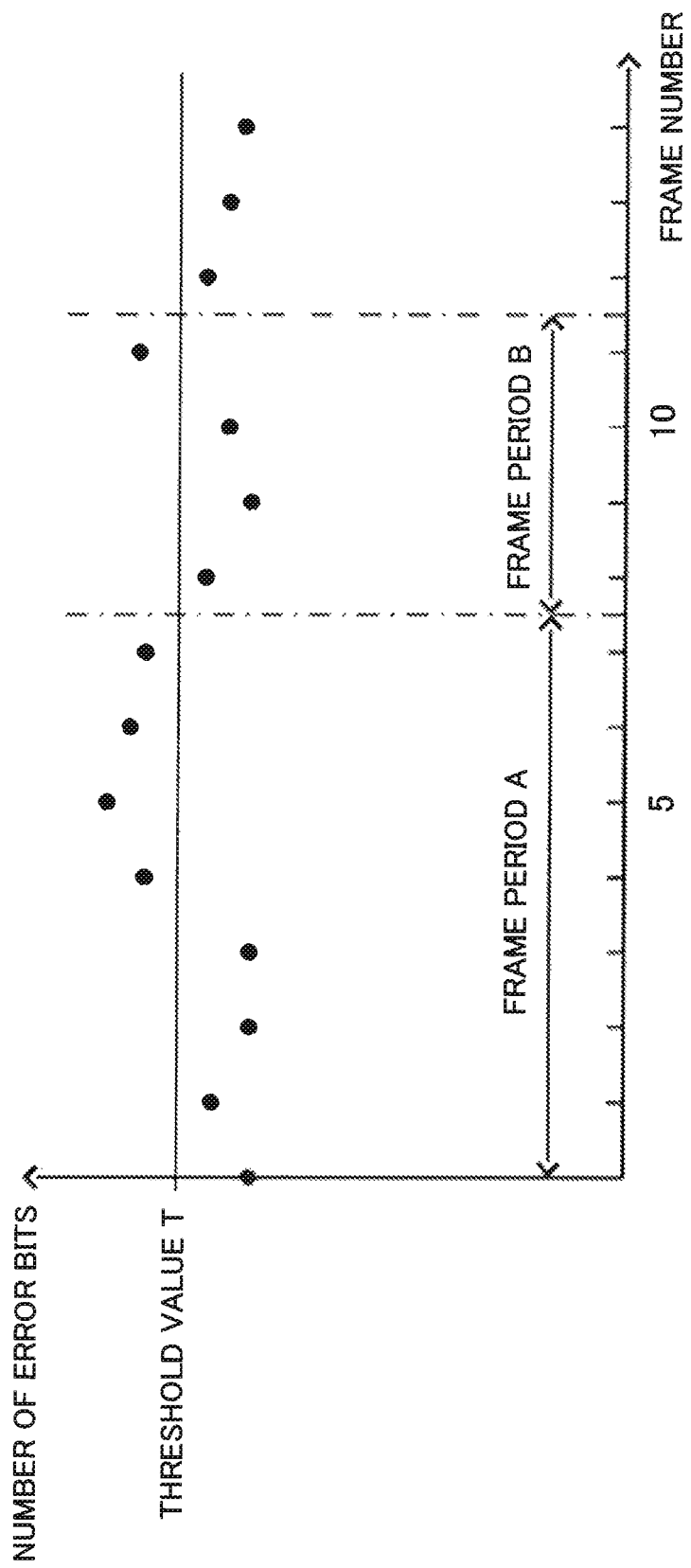
FIG. 9 shows a diagram for explaining the example of the operation of the count unit of the second example embodiment of the present invention.

FIG. 9 is a diagram illustrating an example of the number of error bits of each frame. FIG. 10 is a diagram illustrating the comparison result on the latest frame (a), the number of times of continuous occurrence of "Larger than threshold value" (b), and the number of times of continuous occurrence of "Equal to or smaller than threshold value" (c).

The number-of-error-bits comparison unit 304 compares the number of error bits with a preset threshold value T, per frame. Since the number of error bits is equal to or smaller than the threshold value T in each of frames whose frame numbers are 0 to 3, the comparison result indicates "Equal to or smaller than threshold value". The count unit 305 carries out determination of "YES" in Step S202 of FIG. 8, and clears the number of times of continuous occurrence of "Larger than threshold value" (b). Then, the count unit 305 adds 1 to the number of times of continuous occurrence of "Equal to or smaller than threshold value" (c) and updates the comparison result on the latest frame (a) to be "Equal to or smaller than threshold value". At a time of the frame whose frame number is 3, b is 0, and c is 4.

In each of frames whose frame numbers are 4 to 7, the comparison result indicates "Larger than threshold value". Then, the count unit 305 carries out determination of "NO" in Step S201, and adds 1 to the number of times of continuous occurrence of "Larger than threshold value" (b), and updates the comparison result on the latest frame (a) to be "Larger than threshold value". At the time of the frame whose frame number is 7, b is 4, and c is 4.

In a frame whose frame number is 8, the comparison result changes from "Larger than threshold value" to "Equal to or smaller than threshold value". The count unit 305 carries out determination of "NO" in Step 202, and outputs that the number of times of continuous occurrence of "Larger than threshold value" (b) is 4, and the number of times of continuous occurrence of "Equal to or smaller than threshold value" (c) is 4 to the output unit 306. Moreover, the output unit 306 outputs that b is 4, and c is 4 to the following unit. Then, the count unit 305 clears the number of times of continuous occurrence of "Larger than threshold value" (b), and the number of times of continuous occurrence of "Equal to or smaller than threshold value" (c), and adds 1 to the number of times of continuous occurrence of "Equal to or smaller than threshold value" (c). Moreover, the count unit 305 updates the comparison result on the latest frame (a) to be "Equal to or smaller than threshold value".

Similarly, the count unit 305 outputs that b is 1, and c is 3 to the output unit 306 at a time of a frame whose frame number is 12. Then, the output unit 306 outputs that b is 1, and c is 3 to the following unit.

The monitoring device 109, which is the following device, holds the inputted numbers of times of continuous occurrence b and c. Then, as will be described in the following, a user can estimate whether the error bit occurs steadily or instantaneously on the basis of the numbers of times of continuous occurrence which are held by the monitoring device 109.

Figure 11:
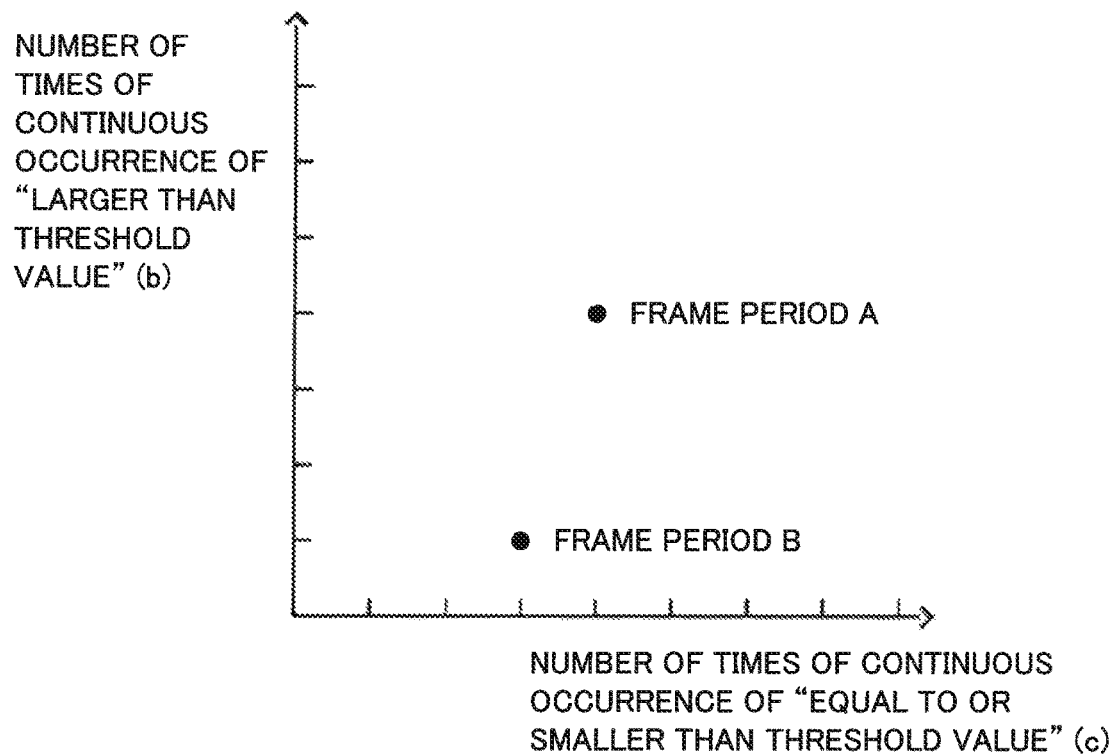
FIG. 11 shows a diagram illustrating an example of plotting a number of times of continuous occurrence according to the second example embodiment of the present invention.

For example, FIG. 11 illustrates an example in which each number of times of continuous occurrence is plotted with reference to the examples of FIG. 9 and FIG. 10, where a X axis and a Y axis of FIG. 11 indicate the number of times of continuous occurrence of "Equal to or smaller than threshold value" (c), and the number of times of continuous occurrence of "Larger than threshold value" (b), respectively. Since b and c in a frame period A is notified at the time of the frame whose frame number is 8, and b and c in a frame period B is notified at the time of the frame whose frame number is 12, b and c in each frame period are plotted. When the bit error occurs more instantaneously, the number of times of continuous occurrence of "Larger than threshold value" is smaller than that of "Equal to or smaller than threshold value", and thereby a plot point is near to the X axis. Therefore, a plot point related to the frame period B is nearer to the X axis and it is possible to estimate that the error occurs more instantaneously in the frame period B.

Figure 12:
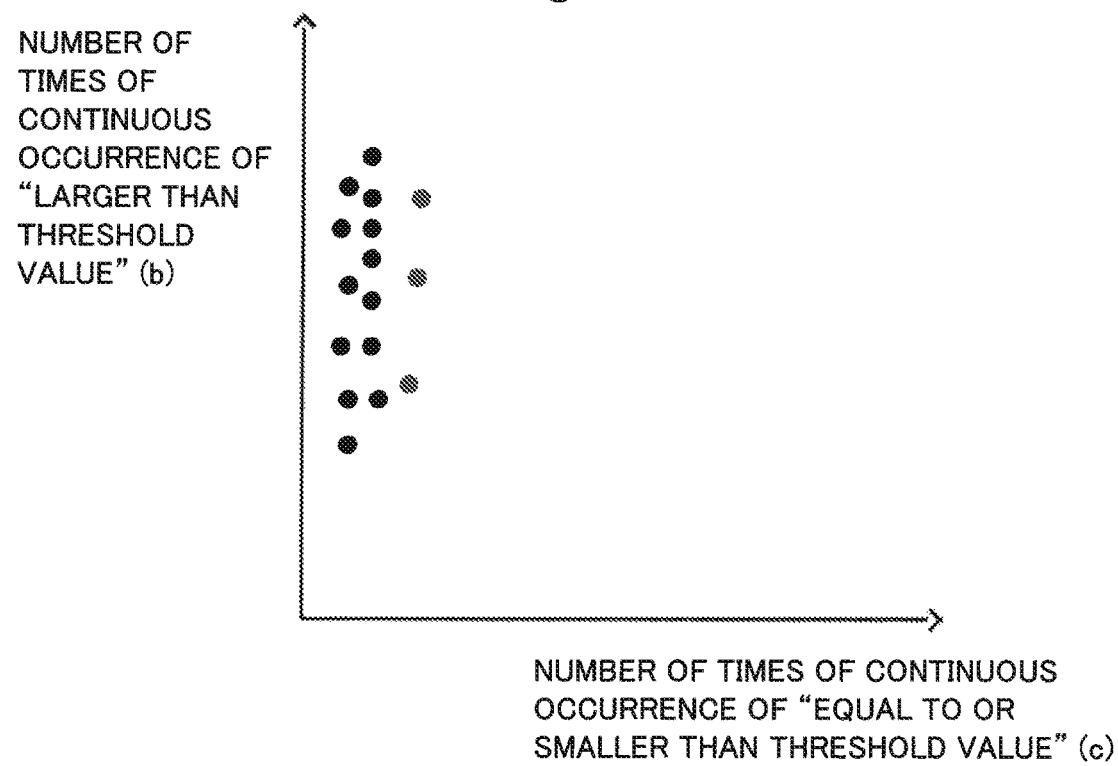
FIG. 12 shows a diagram illustrating another example of plotting the number of times of continuous occurrence according to the second example embodiment of the present invention.
Figure 13:
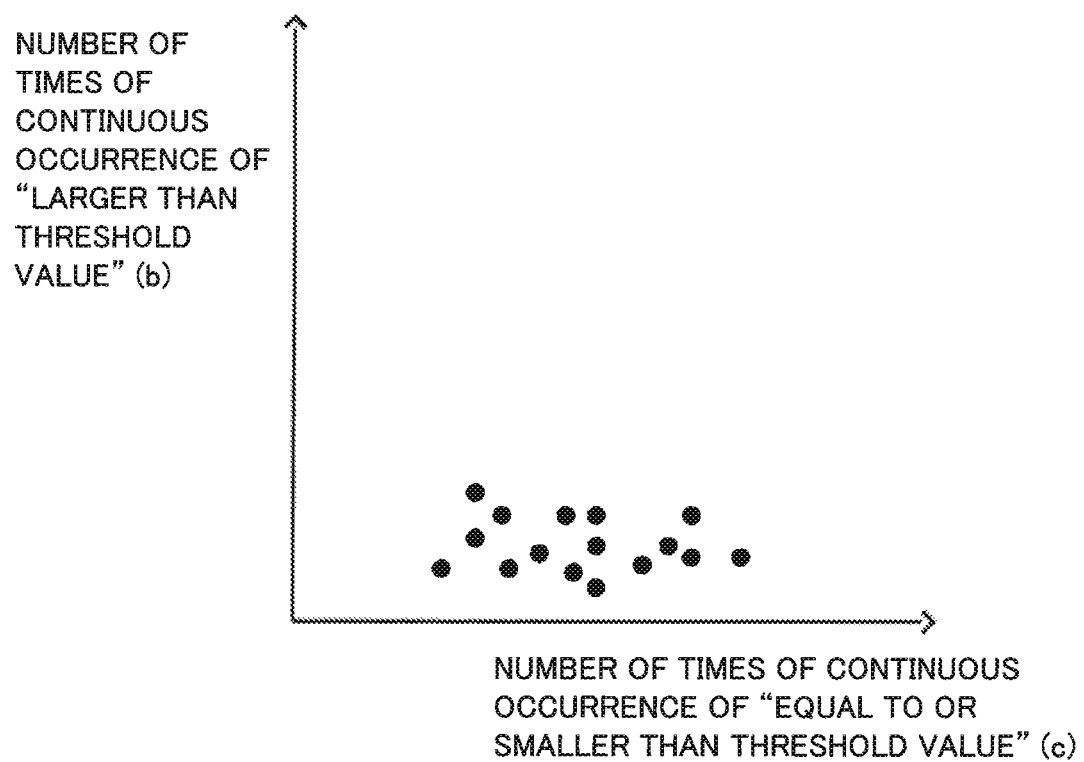
FIG. 13 shows a diagram illustrating another example of plotting the number of times of continuous occurrence according to the second example embodiment of the present invention.
Figure 14:
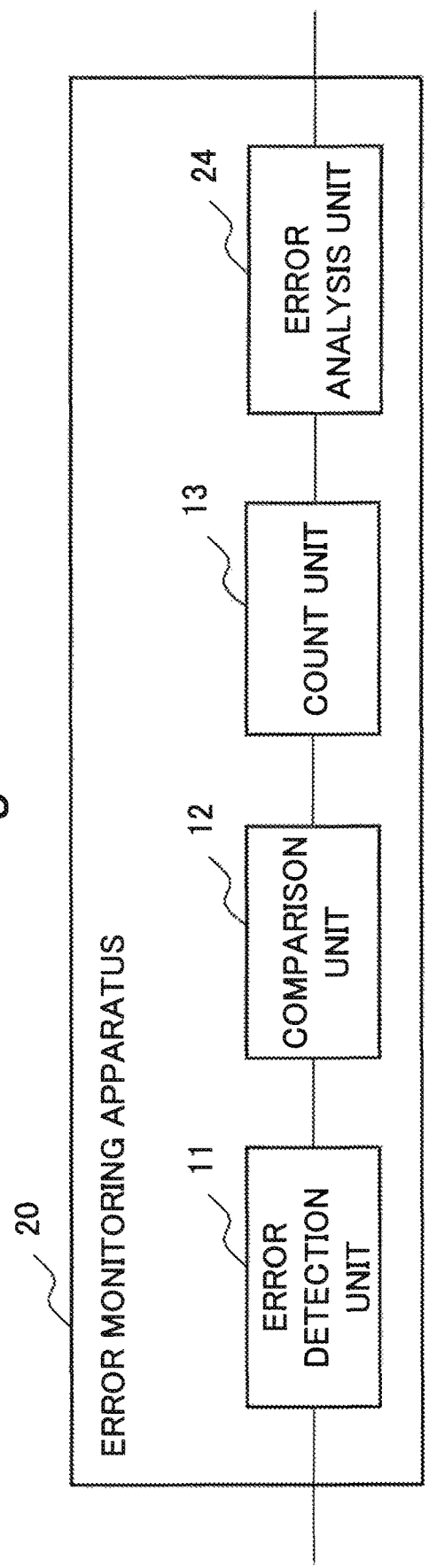
FIG. 14 shows a diagram illustrating another example of the configuration of the error monitoring apparatus of the second example embodiment of the present invention.
Figure 15:
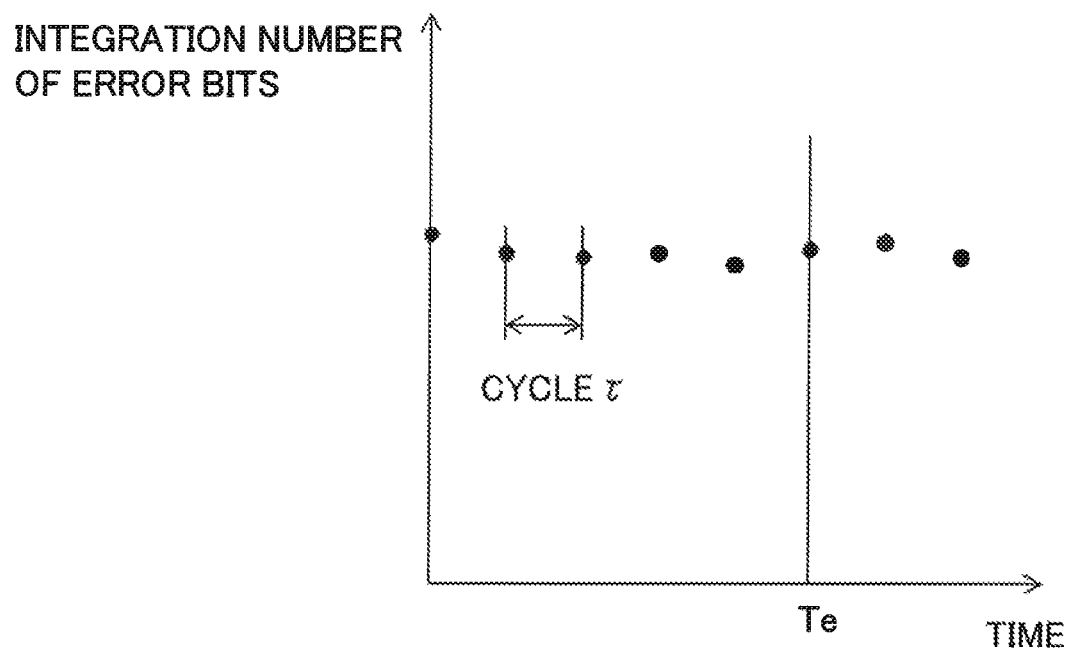
FIG. 15 shows a diagram illustrating an example of an integration number of bit errors.
Figure 16:
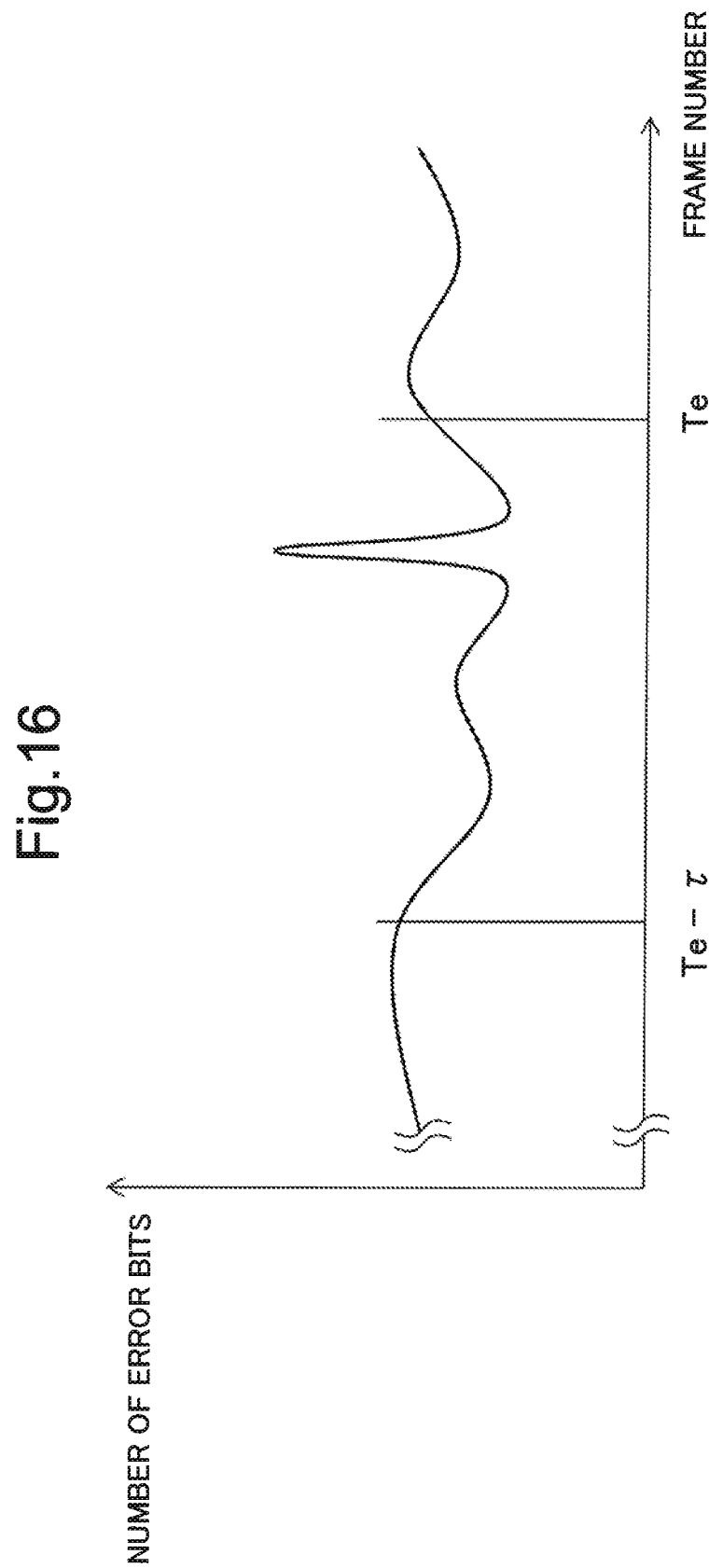
FIG. 16 shows a diagram illustrating an example of a number of error bits.

Each of FIG. 12 and FIG. 13 illustrates an example in which the numbers of times of continuous occurrence in more frame periods are plotted. When the plot point is near to the Y axis as illustrated in FIG. 12, it is possible to determine that the error occurs steadily. On the other hand, when the plot point is near to the X axis as illustrated in FIG. 13, it is possible to determine that the error occurs instantaneously. In this way, the user can estimate whether the error bit occurs steadily or instantaneously for more frame periods. Here, it is possible for the monitoring device 109 to carry out the analysis mentioned above, and it is also possible for an error analysis unit 24 of an error monitoring apparatus 20 as illustrate in FIG. 14.

By working the error monitoring apparatus 10 as mentioned above, it is possible to estimate whether the bit error occurs steadily or instantaneously.

As mentioned above, according to the second example embodiment as well as the first example embodiment, the number of error bits is compared with the predetermined threshold value, and the number of times of continuous occurrence of the comparison result's indicating being large, and the number of times of continuous occurrence of the comparison result's indicating being small are counted and outputted. It is possible to estimate that the error occurs steadily when a state that the number of error bits is large occurs more continuously than a state that the number of error bits is small, and that the error occurs instantaneously when the state that the number of error bits is small occurs more continuously than the state that the number of error bits is large. Therefore, it is possible to estimate whether the bit error occurs steadily or instantaneously.

Third Example Embodiment

Next, a third example embodiment of the present invention will be explained.

In the present example embodiment, a method that the error detection unit 11 detects the number of error bits by using predetermined test data in place of carrying out error correction will be explained in the following.

An example of the configuration of the error monitoring apparatus 10 of the present example embodiment is the same as the example illustrated in FIG. 1. Moreover, an example of the operation is the same as the example illustrated in FIG. 2.

According to the present example embodiment, the error detection unit 11 detects the number of error bits by using the predetermined test data in place of carrying out error correction.

Firstly, a device on a transmission side (for example, the multiplex terminal station 105 illustrated in FIG. 3) converts the predetermined test data into an optical signal, and transmits the optical signal. The test data may be fixed data, or may be data changeable based on a predetermined rule.

The error monitoring apparatus 10 on a reception side (for example, the multiplex terminal station device 108 illustrated in FIG. 3) converts the received optical signal into an electrical signal, and compares the electrical signal with the predetermined test data bit by bit. In this way, it is possible to detect the number of error bits per bits whose number is predetermined.

Since the comparison unit 12 and the count unit 13, which are the following units, are the same as those of the second exemplary embodiment, explanation on the comparison unit 12 and the count unit 13 is omitted.

As mentioned above, according to the third example embodiment of the present invention as well as the first and the second example embodiments, the number of error bits is compared with the predetermined threshold value, and the number of times of continuous occurrence of the comparison result's indicating being large, and the number of times of continuous occurrence of the comparison result's indicating being small are counted and outputted. It is possible to estimate that the error occurs steadily when a state that the number of error bits is large occurs more continuously than a state that the number of error bits is small, and that the error occurs instantaneously when the state that the number of error bits is small occurs more continuously than the state that the number of error bits is large. Therefore, it is possible to estimate whether the bit error occurs steadily or instantaneously.

Furthermore, it is possible to detect the number of errors even when errors, whose number is larger than number of errors to be corrected, occur.

While the example embodiments of the present invention have been explained in the above by exemplifying the transmission system using the optical signal, the example embodiments are applicable to a transmission system using a signal other than the optical signal such as an electrical signal, or the like.

The whole or part of the example embodiments disclosed above can be described as, but not limited to, the following supplementary notes.

(Supplementary Note 1)

An error monitoring apparatus comprising:

an error detection means for detecting number of error bits of received data per bits whose number is predetermined;

a comparison means for comparing the number of error bits with a threshold value which is predetermined; and a count means for counting and outputting number of times of continuous occurrence of the comparison result's indicating being large, and number of times of continuous occurrence of the comparison result's indicating being small.

(Supplementary Note 2)

The error monitoring apparatus according to Supplementary note 1, wherein the error detection means detects the number of error bits based on an error detection code for detecting an error of the received data.

(Supplementary Note 3)

The error monitoring apparatus according to Supplementary note 1, wherein the error detection means detects the number of error bits based on a difference between test data which is predetermined, and the received data.

(Supplementary Note 4)

The error monitoring apparatus according to any one of Supplementary notes 1 to 3, wherein, when the comparison result changes, the count means outputs the number of times of continuous occurrence, and clears the number of times of continuous occurrence.

(Supplementary Note 5)

The error monitoring apparatus according to Supplementary note 4, wherein the counting means outputs the number of times of continuous occurrence when the comparison result changes in indication from being large to being small.

(Supplementary Note 6)

The error monitoring apparatus according to any one of Supplementary notes 1 to 5, further comprising:

an error analysis means for analyzing whether an error is steady or instantaneous based on the number of times of continuous occurrence.

(Supplementary Note 7)

An error monitoring method comprising:

detecting number of error bits of received data per bits whose number is predetermined;

comparing the number of error bits with a threshold value which is predetermined; and counting and outputting number of times of continuous occurrence of the comparison result's indicating being large, and number of times of continuous occurrence of the comparison result's indicating being small.

(Supplementary Note 8)

The error monitoring method according to Supplementary note 7, further comprising:

detecting the number of error bits based on an error detection code for detecting an error of the received data.

(Supplementary Note 9)

The error monitoring method according to Supplementary note 7, further comprising:

detecting the number of error bits based on a difference between test data which is predetermined, and the received data.

(Supplementary Note 10)

The error monitoring method according to any one of Supplementary notes 7 to 9, further comprising:

outputting the number of times of continuous occurrence, and clearing the number of times of continuous occurrence, when the comparison result changes.

(Supplementary Note 11)

The error monitoring method according to Supplementary note 10, further comprising:

outputting the number of times of continuous occurrence when the comparison result changes in indication from being large to being small.

(Supplementary Note 12)

The error monitoring method according to any one of Supplementary notes 7 to 11, further comprising:

analyzing whether an error is steady or instantaneous based on the number of times of continuous occurrence.

(Supplementary Note 13)

A computer readable recording medium recorded with an error monitoring program which causes a computer to execute:

an error detection function of detecting number of error bits of received data per bits whose number is predetermined;

a comparison function of comparing the number of error bits with a threshold value which is predetermined; and a count function of counting and outputting number of times of continuous occurrence of the comparison result's indicating being large, and number of times of continuous occurrence of the comparison result's indicating being small.

(Supplementary Note 14)

The computer readable recording medium recorded with the error monitoring program according to Supplementary note 13, wherein the error detection function detects the number of error bits based on an error detection code for detecting an error of the received data.

(Supplementary Note 15)

The computer readable recording medium recorded with the error monitoring program according to Supplementary note 13, wherein the error detection function detects the number of error bits based on a difference between test data which is predetermined, and the received data.

(Supplementary Note 16)

The computer readable recording medium recorded with the error monitoring program according to any one of Supplementary notes 13 to 15, wherein, when the comparison result changes, the count function outputs the number of times of continuous occurrence, and clears the number of times of continuous occurrence.

(Supplementary Note 17)

The computer readable recording medium recorded with the error monitoring program according to Supplementary note 16, wherein the count function outputs the number of times of continuous occurrence when the comparison result changes in indication from being large to being small.

(Supplementary Note 18)

The computer readable recording medium recorded with the error monitoring program according to any one of Supplementary notes 13 to 17, the error monitoring program further causing a computer to execute:

an error analysis function of analyzing whether an error is steady or instantaneous based on the number of times of continuous occurrence.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2015-162014, filed on Aug. 19, 2015, the disclosure of which is incorporated herein in its entirety by reference.

REFERENCE SIGNS LIST 10 and 20 Error monitoring apparatus
11 Error detection unit
12 Comparison unit
13 Count unit
14 Error analysis unit
101 to 104, and 110 to 113 SDH terminal station device
105 and 108 Multiplex terminal station device
106 and 109 Monitoring device
107 Long-haul optical fiber transmission line

What is claimed is:

1. An error monitoring apparatus, comprising:
   an error detection unit configured to detect number of error bits of received data per bits whose number is predetermined;
   a comparison unit configured to compare the number of error bits with a threshold value which is predetermined;
   a count unit configured to count number of times of continuous occurrence of the comparison result's indicating being large, and number of times of continuous occurrence of the comparison result's indicating being small;
   an output unit configured to output the counted result about the number of times of continuous occurrence of the comparison result's indicating being large, and the number of times of continuous occurrence of the comparison result's indicating being small; and
   an error analysis unit configured to estimate that an error occurs steadily based on a state that the number of error bits is large occurs more continuously than a state that the number of error bits is small or estimate that the error occurs instantaneously when the state that the number of error bits is small occurs more continuously than the state that the number of error bits is large.

2. The error monitoring apparatus according to claim 1, wherein
   the error detection unit detects the number of error bits based on an error detection code for detecting an error of the received data.

3. The error monitoring apparatus according to claim 1, wherein
   the error detection unit detects the number of error bits based on a difference between test data which is predetermined, and the received data.

4. The error monitoring apparatus according to claim 1, wherein,
   when the comparison result changes, the count unit outputs the number of times of continuous occurrence, and clears the number of times of continuous occurrence.

5. The error monitoring apparatus according to claim 4, wherein
the counting unit outputs the number of times of continuous occurrence when the comparison result changes in indication from being large to being small.

6. The error monitoring apparatus according to claim 1, wherein the error analysis unit further analyzes whether the error is steady or instantaneous based on the number of times of continuous occurrence.

7. An error monitoring method comprising:
detecting number of error bits of received data per bits whose number is predetermined;
comparing the number of error bits with a threshold value which is predetermined;
counting and outputting number of times of continuous occurrence of the comparison result's indicating being large, and number of times of continuous occurrence of the comparison result's indicating being small; and
estimating that the error occurs steadily based on a state that the number of error bits is large occurs more continuously than a state that the number of error bits is small or estimating that the error occurs instantaneously when the state that the number of error bits is small occurs more continuously than the state that the number of error bits is large.

8. The error monitoring method according to claim 7, further comprising:
detecting the number of error bits based on an error detection code for detecting an error of the received data.

9. The error monitoring method according to claim 7, further comprising:
outputting the number of times of continuous occurrence, and clearing the number of times of continuous occurrence, when the comparison result changes.

10. The error monitoring method according to claim 9, further comprising:
outputting the number of times of continuous occurrence when the comparison result changes in indication from being large to being small.

11. The error monitoring method according to claim 7, further comprising:
detecting the number of error bits based on a difference between test data which is predetermined, and the received data.

12. The error monitoring method according to claim 7, further comprising:
analyzing whether the error is steady or instantaneous based on the number of times of continuous occurrence.

13. A non-transitory computer readable recording medium recorded with an error monitoring program which causes a computer to execute:
an error detection function of detecting number of error bits of received data per bits whose number is predetermined;
a comparison function of comparing the number of error bits with a threshold value which is predetermined;
a count function of counting and outputting number of times of continuous occurrence of the comparison result's indicating being large, and number of times of continuous occurrence of the comparison result's indicating being small; and
an error analysis function configured to estimate that the error occurs steadily based on a state that the number of error bits is large occurs more continuously than a state that the number of error bits is small or estimate that the error occurs instantaneously when the state that the number of error bits is small occurs more continuously than the state that the number of error bits is large.

14. The non-transitory computer readable recording medium recorded with the error monitoring program according to claim 13, wherein
the error detection function detects the number of error bits based on an error detection code for detecting an error of the received data.

15. The non-transitory computer readable recording medium recorded with the error monitoring program according to claim 13, wherein
the error detection function detects the number of error bits based on a difference between test data which is predetermined, and the received data.

16. The non-transitory computer readable recording medium recorded with the error monitoring program according to claim 13, wherein,
when the comparison result changes,
the count function outputs the number of times of continuous occurrence, and clears the number of times of continuous occurrence.

17. The non-transitory computer readable recording medium recorded with the error monitoring program according to claim 16, wherein
the count function outputs the number of times of continuous occurrence when the comparison result changes in indication from being large to being small.

18. The non-transitory computer readable recording medium recorded with the error monitoring program according to claim 13,
wherein the error analysis function further analyzes whether the error is steady or instantaneous based on the number of times of continuous occurrence.

* * * * *